J. BINGHAM.
ROLLER BEARING.
APPLICATION FILED FEB. 3, 1919.
1,416,680.
Patented May 23, 1922.
2 SHEETS—SHEET 1.
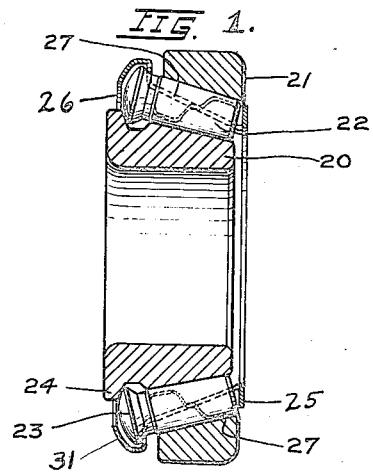
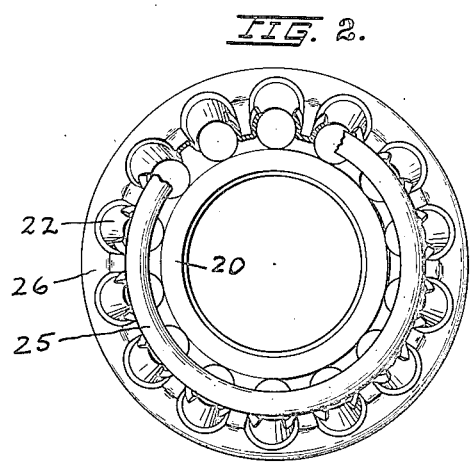
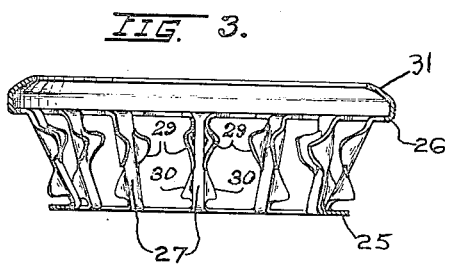
Inventor
JEREMIAH BINGHAM.
By
Attorney

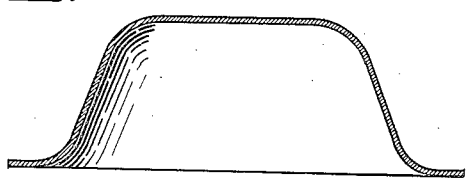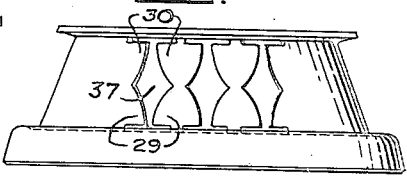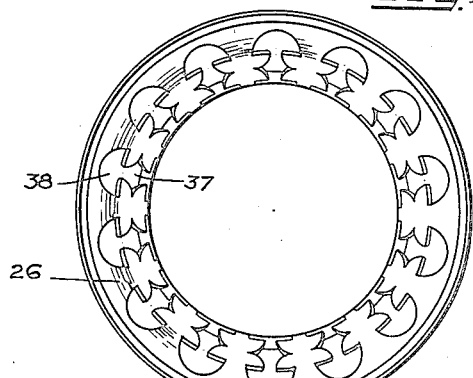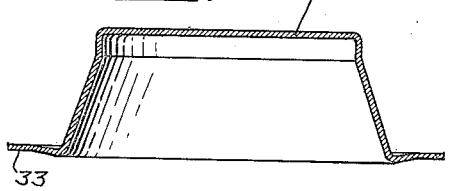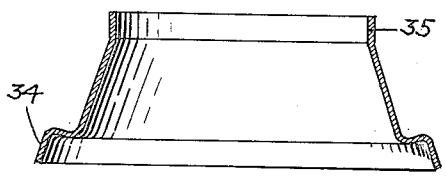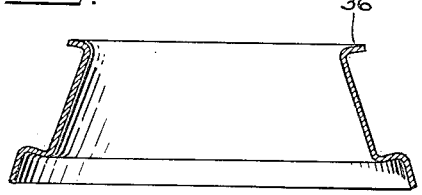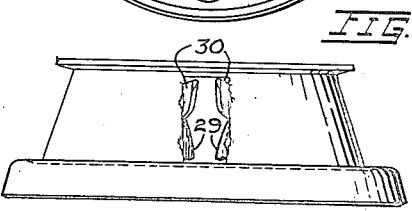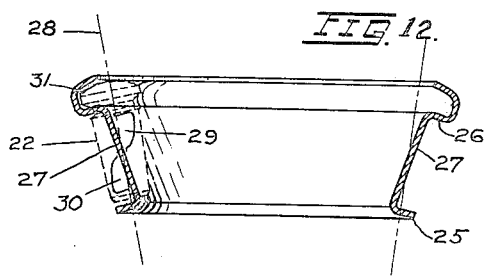

UNITED STATES PATENT OFFICE.

JEREMIAH BINGHAM, OF TOLEDO, OHIO, ASSIGNOR TO THE BOCK BEARING COMPANY, OF TOLEDO, OHIO, A CORPORATION OF OHIO.

ROLLER BEARING.

1,416,680.

Specification of Letters Patent. Patented May 23, 1922.

Application filed February 3, 1919. Serial No. 274,600.

*To all whom it may concern:*

Be it known that I, JEREMIAH BINGHAM, a citizen of the United States, and a resident of Toledo, county of Lucas, State of Ohio, have invented certain new and useful Improvements in Roller Bearings, of which the following is a specification.

This invention relates to roller bearings, and more particularly to cages for tapered-roller bearings.

It is one of the objects of the invention to provide a cage that may be manufactured from a single piece of metal and which will have the requisite strength and durability to retain the rollers in their proper position under all normal operating conditions of the bearing.

It is a further object of the invention to provide a cage that will be comparatively inexpensive to manufacture and which will also be adapted for production in large quantities, within commercial limits of accuracy.

Other objects and the features of novelty will be apparent from the following description taken in connection with the accompanying drawings, of which:

Figure 1 is a longitudinal section through a tapered-roller bearing, embodying the invention;

Figure 2 is a side view of the bearing shown in Figure 1, with certain parts broken away to show other parts in section;

Figure 3 is a longitudinal section through the cage illustrated in Figures 1 and 2, without the rollers;

Figure 4 is an edge view of the blank used in making the cage;

Figures 5, 6, 7 and 8 are sectional views of the cage in successive steps of manufacture;

Figure 9 is a side view of the cage with the operation succeeding that shown in Figure 8 partially completed;

Figure 10 is a bottom view of the cage as it appears in Figure 9, but with all of the openings formed;

Figure 11 is a side view, similar to Figure 9, and showing one of the sets of wings in their final position; and Figure 12 is a sectional view of the cage, showing the next operation after Figure 11.

Referring to the drawings, it will be observed that I have illustrated in Figures 1 and 2 a tapered-roller bearing comprising the cone 20, the cup 21 and a series of rollers 22. The bearing illustrated is of the type shown in the Bock Patent No. 1,144,751, granted June 29, 1915. In this type of bearing, each of the rollers is provided with an enlarged head 23 having a spherical surface which contacts with a flange 24 on the cone 20, for the purpose of holding the rollers against axial displacement.

The bearing which I have illustrated is of the three-unit type, in which neither the cone 20 nor cup 21 have the rollers permanently assembled therewith, but, on the other hand, have the rollers carried by a suitable cage, or container, which constitutes a separate, or the third unit of the bearing.

The present invention has to do entirely with the cage for the rollers and the function of this cage, in addition to being a container for the rollers, is to also properly space them circumferentially and to hold them from getting out of their proper position.

The cage which I have invented is, generally speaking, of a conical form and includes a flange 25 on the smaller end and an outwardly turned flange 26 on the larger end, these flanges being connected together by the spacing members 27, which, preferably, are inclined, with respect to the conical path of the roller axes, as most clearly shown in Figure 1. In Figure 12, I have indicated the axis of one of the rollers at 28 and it will be observed that the spacing member 27 crosses the axis 28 substantially at the middle of the rolling surface of the roller 22. On the opposite edges of the spacing members 27 there are pairs of inwardly turned wings 29 and outwardly turned wings 30, and these wings are so shaped as to conform to the rolling surface of the roller, although permitting the roller to rotate freely. It will be observed that the wings 29 and 30 cooperate with the opposite end portions of the rolling surface of the roller and serve to hold the latter in proper alignment. Also, by having the spacing members 27 cross the roller axes, the wings 29 and 30 are better adapted to hold the ends of the roller from displacements laterally, or, in other words, radially, with respect to the axis of the cage.

An inwardly turned flange 31 is provided on the periphery of the flange 26 and so covers the ends of the rollers as to prevent the latter from being displaced axially, The wings 29 and 30 and the flanges 25 and 31 thus cooperate to retain the rollers in the cage.

The various steps, or operations, in the manufacture of my improved cage are illustrated in Figures 4 to 12, inclusive. Figure 4 represents a circular blank of sheet metal and by the first operation, which will be performed on a stamping press, the blank is formed into the cup illustrated in Figure 5. As a result of the next operation, which is also performed in a stamping press, by means of suitable dies, the cup shown in Figure 5 has its shape changed to that illustrated in Figure 6. In the next operation, the bottom 32, of the cup illustrated in Figure 6, is punched out and the flange 33 is drawn into the conical form 34, illustrated in Figure 7. By means of suitable dies, the flange 35, shown in Figure 7, is turned outwardly, as indicated at 36 in Figure 8. By means of suitable punches, the requisite number of openings 37 are formed in the cup illustrated in Figure 8, this operation being illustrated in Figure 9. By the succeeding operation, the semi-circular openings 38 are formed in the flange 26 at the large end of the cage and the cage will then have the appearance shown in Figure 10. By means of suitable dies, the wings 29 and 30 are next thrown into the positions shown in Figure 11. The cage is then positioned, as illustrated in Figure 12, and the rollers placed in the pockets, after which the flange 34 is turned inwardly over the heads of the rollers, to form the flange 31, illustrated in Figure 12, and thus completing the cage unit.

While I have illustrated the cage in its various stages of manufacture, I have not deemed it necessary to illustrate the various dies and tools with which the different operations are performed, as these are matters which will be readily understood by those skilled in stamping.

Having thus described my invention, what I claim is:

A one-piece cage for tapered-roller bearings comprising end flanges, spacing members between the rollers, connecting said flanges, but inclined relatively to the conical path of the roller axes and crossing the latter substantially at the middle of the rolling surface of the rollers, a pair of inwardly turned wings on the opposite edges of one end of each of said spacing members and a pair of outwardly turned wings on the opposite edges of the other end of each of said members.

In testimony whereof I affix my signature.

JEREMIAH BINGHAM.